Figure 1:
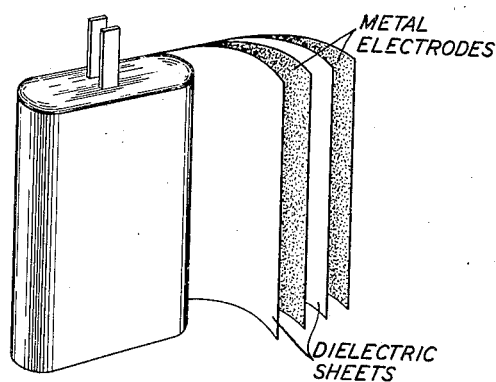

Dec. 25, 1945.  D. A. McLEAN  2,391,686
ELECTRICAL CONDENSER AND DIELECTRIC ELEMENTS
Original Filed Aug. 31, 1938

INVENTOR
D. A. McLEAN
BY
*B. H. Jackson*
ATTORNEY

Patented Dec. 25, 1945

2,391,686

UNITED STATES PATENT OFFICE 2,391,686

ELECTRICAL CONDENSER AND DIELECTRIC ELEMENT

David A. McLean, Chatham, N. J., assignor to Bell Telephone Laboratories, Incorporated, New York, N. Y., a corporation of New York Original application August 31, 1938, Serial No. 227,652. Divided and this application November 14, 1940, Serial No. 365,642

12 Claims. (Cl. 175—41)

The present invention relates to novel dielectric elements and to electrical condensers containing novel dielectrics. More particularly, it relates to electrical condensers having dielectrics containing or impregnated with halogenated materials which tend to break down slightly to form halogen acids and also containing substances which tend to increase the life of the dielectric. This application is a division of the application of David A. McLean, Serial No. 227,652, filed August 31, 1938.

It has been found that certain halogenated substances or more particularly, certain halogenated organic compounds, chiefly halogenated aromatic or cyclic hydrocarbons such as the chlorinated hydrocarbons, chlorinated naphthalene and chlorinated diphenyl, are very desirable materials for condenser dielectrics. Ordinarily they are employed by impregnating them in porous spacers such as paper, textiles or other cellulosic materials. The resultant dielectrics possess a high dielectric constant, high resistance, low dielectric loss and high chemical stability.

According to the present invention, it has been found that the life of condensers containing this type of dielectric can be considerably prolonged and that the ultimate failure of the dielectric, particularly when the condensers are operating under direct current potentials and at elevated temperatures, can be postponed by incorporating in the dielectric materials which act as stabilizers for the halogenated materials.

The ultimate failure of the dielectric appears to be due to disintegration of the compounds composing it. Inspection of an impregnated paper dielectric of this type after failure shows it to be spotted with carbonized and decomposed areas.

Although the invention is not to be limited to any theory of operation, it is believed that the failure of the dielectric is due to the fact that the halogenated dielectric materials, such as chlorinated naphthalene and chlorinated diphenyl, although they are ordinarily considered stable, tend to decompose slightly, particularly under the influence of an electrical field, to form traces of halogen compounds, chiefly hydrohalogen acids, such as hydrochloric acid. This decomposition process is autocatalytic in that the trace of hydrohalogen acid formed tends to accelerate the further decomposition of the halogenated compounds. The presence of this hydrohalogen acid, which acts as an electrolyte, decreases the resistance of the dielectric in the areas in which it is concentrated and, in the case of an impregnated paper dielectric, the combined electrical and chemical action causes the destruction of the cellulose of the paper spacer.

The presence of free acid is also objectionable because it causes corrosion of the metal electrodes. When aluminum electrodes are employed, as is often preferable, reactions involving traces of hydrochloric acid are particularly objectionable since the aluminum together with the hydrochloric or other hydrohalogen acid forms aluminum chloride or other aluminum halide. Aluminum chloride, for example, is known to be a catalyst for the destruction of halogenated organic compounds and, therefore, causes the formation of additional hydrochloric acid. Both the aluminum halide and the hydrohalogen acid act to cause the breakdown of the cellulose in the paper spacer and consequent failure of the dielectric.

It is an object of the present invention to increase the life of condenser dielectrics containing halogenated materials. Broadly this is accomplished by incorporating in the dielectric a substance capable of reacting with the generated hydrohalogen acids to form substantially inert and preferably non-electrolyte substances. Only very small amounts of these materials are required to be added since, if the small amount of generated acid is neutralized or rendered inactive, the autocatalytic action of the acid is prevented so that the decomposition of the halogenated substances is much less rapid. The added substances may function either through chemical or physical action. Thus, substances which neutralize the acid or materials which remove acid through physical adsorption may be used.

Figure 2:
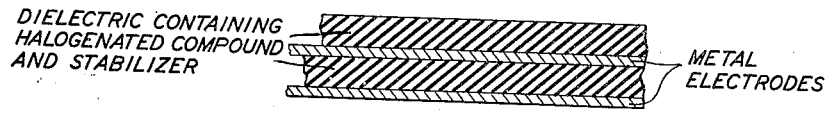

The manner in which the present invention may be applied to condensers may better be understood by reference to the accompanying drawing in which:

Fig. 1 represents a roll type condenser made up of two electrodes separated by a dielectric material; and Fig. 2 shows a sectional view of the electrodes spaced by a dielectric containing a halogenated dielectric material and a stabilizing or neutralizing material.

The substances capable of rendering hydrohalogen acids inactive consist of materials which function through adsorption or through base exchange or both. These materials may be purely physical adsorbents which act merely to adsorb the hydrogen ions from the dielectric or they may be base-exchange materials which function by substituting a metallic element such as the alkali or alkaline earth metals for the hydrogen ions. Examples of these materials are silica gel, adsorbent carbon, bentonite, fuller's earth, diatomaceous earth, natural or artificial zeolites or similar natural or artificial base-exchange minerals and also base-exchange resins, such as those known as the organolites. Some materials, such as bentonite, fuller's earth, diatomaceous earth and the zeolites, function as either mere adsorbents or base-exchange bodies or both depending upon whether or not they contain bases capable of exchange. Preferably the base-exchange materials are employed in a state in which they contain metal ions capable of exchange. Thus calcium bentonite is preferable to hydrogen bentonite, for example. The adsorbent or base-exchange bodies are preferably employed in amounts ranging from about .2 per cent by weight of the dielectric to about 5 to 10 per cent by weight.

The stabilizers above referred to may be added to the dielectric in any suitable manner. For instance, when a porous spacer such as paper, a textile or other cellulosic material is employed, it may be impregnated with a suspension of the stabilizer in water or other suitable medium.

When a paper spacer is used, the stabilizer may conveniently be incorporated in the paper pulp prior to the formation of the paper sheet.

Any of these methods may be employed to form a condenser, as for example, the type shown in the drawing. Fig. 1 shows a rolled condenser made up of alternate layers of metal foil, such as aluminum or tin foil, and dielectric material. This condenser may be prepared by incorporating the desired stabilizer in a sheet of cellulosic material, such as paper, and placing the desired number of dielectric sheets between two or more metal sheets. The alternate layers of dielectric and metal electrodes may then be rolled into the condenser shown in Fig. 1 and dipped into the halogenated impregnating medium. The condenser may then be placed in a protecting case or otherwise utilized as desired. Fig. 2 shows a section of one turn of the finished rolled condenser showing the alternate electrodes and dielectric layers. The finished dielectric contains a stabilizer together with the halogenated dielectric material.

As a specific example, calcium bentonite is added to a linen paper pulp in an amount sufficient to yield about 2 per cent of bentonite in the finished paper. When the bentonite is uniformly dispersed, the pulp is formed into a sheet, dried and calendered according to the usual procedure for making paper. The paper is then formed into a condenser as described above and impregnated with chlorinated naphthalene. Alternatively it is impregnated with chlorinated diphenyl.

It is to be understood that in the following claims the term "solid adsorbent" is intended to include only those highly adsorbent materials which are used technically for various purposes because of their adsorbent properties. Although the invention has been described in its more specific aspects, it is to be understood that it is of broad application and is not limited to any theory of operation, the scope of the invention being limited only by the scope of the appended claims.

What is claimed is:

1. A dielectric element comprising paper containing bentonite the exchangeable hydrogen ions of which have been replaced at least in part by metal ions, said paper being impregnated with a chlorinated aromatic hydrocarbon.

2. An electric condenser comprising spaced metal electrodes separated by a porous spacer impregnated with a chlorinated aromatic hydrocarbon and containing a solid adsorbent.

3. A condenser as described in claim 2 wherein the chlorinated aromatic hydrocarbon is chlorinated diphenyl.

4. A condenser as described in claim 2 wherein the chlorinated aromatic hydrocarbon is chlorinated naphthalene.

5. An electric condenser comprising spaced metal electrodes separated by a paper spacer impregnated with a chlorinated aromatic hydrocarbon and containing bentonite.

6. A condenser as described in claim 5 wherein the chlorinated aromatic hydrocarbon is chlorinated diphenyl.

7. A condenser as described in claim 5 wherein the chlorinated aromatic hydrocarbon is chlorinated naphthalene.

8. An electric condenser comprising spaced metal electrodes separated by a paper spacer impregnated with a chlorinated aromatic hydrocarbon and containing fuller's earth.

9. A condenser as described in claim 8 wherein the chlorinated aromatic hydrocarbon is chlorinated diphenyl.

10. A condenser as described in claim 8 wherein the chlorinated aromatic hydrocarbon is chlorinated naphthalene.

11. A dielectric element comprising paper impregnated with chlorinated diphenyl and containing bentonite the exchangeable hydrogen ions of which have been replaced at least in part by metal ions.

12. A dielectric element comprising paper impregnated with chlorinated naphthalene and containing bentonite the exchangeable hydrogen ions of which have been replaced at least in part by metal ions.

DAVID A. McLEAN.